Patented Nov. 6, 1934

1,979,565

UNITED STATES PATENT OFFICE 1,979,565

TREATMENT OF HYDROCARBON OILS

Jacque C. Morrell and Gustav Egloff, Chicago, Ill.,
assignors to Universal Oil Products Company,
Chicago, Ill., a corporation of South Dakota No Drawing. Application January 29, 1931,
Serial No. 512,207

2 Claims. (Cl. 196—36)

This invention relates to the treatment of hydrocarbon oils, and refers more particularly to the refining of the relatively low boiling hydrocarbon distillates.

In one of its specific aspects the invention embodies a process for the refining of cracked hydrocarbon oils and comprises subjecting such oils to treatment with sulphur dioxide and an oxygen containing gas such as air, oxygen, ozone, preferably with steam, in the presence of a metallic oxide.

The invention has especial application to the refining of the lighter hydrocarbon distillates in the vapor phase and is particularly useful in the refining in the vapor phase of the relatively low boiling products resulting from the conversion of hydrocarbon oils by subjecting the said vapors from the cracking process during or subsequent to fractionation to treatment with sulphur dioxide and oxygen containing gas, such as air, preferably with steam in the presence of a metallic oxide.

The usual method of refining cracked distillates is to subject them to treatment with sulphuric acid and alkaline solutions, including plumbite solutions consisting of litharge dissolved in alkaline solutions in various combinations of treatment and subsequently to subject the acid treated product to redistillation usually in the presence of steam. The present invention permits the direct treatment of the hydrocarbon vapors from the cracking process, reducing the cost of reagents and eliminating the redistillation or rerunning operation, although it is within the scope of the invention to revaporize the product in a subsequent operation and subject the vapors to treatment as described.

Among the metallic oxides which may be used and as examples thereof are the following: The oxides of calcium, magnesium, aluminum, zinc, tin, iron, copper, lead, mercury, cobalt, nickel, chromium, manganese, molybdenum, vanadium, tungsten, and the like. It is within the scope of the present invention to employ mixtures of the metallic oxides.

In applying the process of the invention to practice any suitable equipment may be employed which will permit the contacting of the hydrocarbon vapors and the sulphur dioxide and oxygen containing gas, such as air, preferably with steam, with the metallic oxides; for example, a suitable tower or chamber packed with a selected oxide may be employed following the fractionator of a cracking system, feeding the sulphur dioxide and oxygen containing gas, such as air, directly to the tower, thus permitting contact of the sulphur dioxide and oxygen containing gas, such as air, and hydrocarbons to be treated with the metallic oxide. Sulphur dioxide and oxygen containing gas, such as air, from any suitable source, alone or in combination with steam, may be introduced directly into the tower or treating vessel containing the metallic oxides. In lieu of direct packing of the tower or treating vessel with the metallic oxides an inert filling material such as Raschig rings, firebrick, crushed rock, gravel, crushed ceramic material, and the like, suitably coated with a metallic oxide, or a mixture of the same may be employed. Similarly, any device which permits the efficient contacting of the vapors undergoing treatment with the metallic oxide may be employed.

The tower or treating vessel containing the metallic oxides may be directly connected to a cracking unit or to a rerun or redistillation unit so that the vapors arising therefrom may be treated in the manner described.

It has been found desirable to neutralize the distillate immediately after condensation either by passing the condensate directly through a body of alkaline material such as a solution of caustic soda or by washing the distillate free of sulphur dioxide with water and/or alkalies, such as a solution of caustic soda, ammonia, or the like. The neutralizing agent may also be introduced into the vapor line leading to the condenser or into the condenser itself.

The amount of sulphur dioxide employed may vary from a fraction of a pound to several pounds, based on a barrel of hydrocarbon distillate treated.

Various temperatures of treatment may be employed, for example, from 250°–600° F., more or less, and the pressures may be sub-atmospheric, atmospheric, or superatmospheric. While the results may vary with the temperatures employed, the pressures and temperatures are chosen so that the hydrocarbons are treated substantially in the vapor phase.

As specific examples of the operation of the process of my invention and of the results obtained, a California cracked distillate of approximately motor fuel boiling range is vaporized and subjected to treatment with sulphur dioxide and air together with steam in the presence of zinc oxide. The vapors were passed at a suitable rate through the tower containing the zinc oxide and approximately two pounds per barrel of sulphur dioxide together with air and with steam was introduced into the tower. The untreated product shows a gum content of approximately 500 mgs. per 100 ccs. and is a reddish brown color. The sulphur content is approximately 0.20. The treated product shows a gum content of approximately 30 mgs. per 100 ccs. and has a color of plus 25 on the Saybolt colorimeter scale. The sulphur content was reduced to approximately 0.18. The gum determinations are made by the copper dish method.

When the zinc oxide was distributed over pumice stone similar results to those just described were obtained.

A mixed Mid-Continent and West Texas cracked distillate when treated in the vapor phase with sulphur dioxide and air together with steam employing zinc oxide as a contacting agent gives the following results:

The untreated distillate shows a gum content of approximately 380 mgs. per 100 ccs. and a light amber color. The treated distillate may be reduced in gum content to approximately 25 mgs. per 100 ccs. and a color of approximately 30 on the Saybolt colorimeter scale. The sulphur content may be reduced also.

A California cracked distillate when treated with approximately three pounds of sulphur dioxide and air together with steam in the presence of iron oxide shows the following results:

The untreated distillate contains approximately 600 mgs. of gum per 100 ccs. The treated distillate may contain approximately 40 mgs. per 100 ccs. The untreated distillate is a dark reddish amber in color, and the treated distillate may have a color from 25 to 30 on the Saybolt colorimeter scale. The sulphur content is quite appreciably reduced.

With a Mid-Continent distillate containing approximately 350 mgs. of gum per 100 ccs. and having a dark yellow color one may obtain a product containing approximately 25 mgs. of gum per 100 ccs. having a color of approximately 25-30 on the Saybolt colorimeter scale and with an appreciable reduction in sulphur content by treatment with sulphur dioxide and oxygen containing gas, such as air, preferably with steam employing approximately two pounds per barrel, based on the distillate treated.

The use of tin oxide gives good results when employed as a contacting agent for the treatment of cracked hydrocarbon vapors with sulphur dioxide and oxygen containing gas such as air, and with steam, to those shown for zinc oxide may be obtained, although the results may vary in degree.

The above examples are only illustrative and should not be construed as restrictions or limitations on the broad scope of the invention.

The treatment herein described may constitute the sole refining action on the oil, or it may constitute one step in a series of refining steps. It may be preceded by the usual treatments with refining agents such as sulphuric acid, caustic soda, plumbite, filtering earth or the like, and may be succeeded by any combination of the above refining agents, followed, if desired, by distillation.

We claim as our invention:

1. A step in the refining of the gasoline-containing products resulting from the cracking of hydrocarbon oil, which comprises subjecting such product in vaporous condition and at between 250° F. and 600° F. to treatment with sulphur dioxide and an oxidizing gas containing free oxygen in the presence of an oxide of a heavy metal.

2. A step in the refining of the gasoline-containing products resulting from the cracking of hydrocarbon oil, which comprises subjecting such product in vaporous condition and at between 250° F. and 600° F. to treatment with sulphur dioxide and an oxidizing gas containing free oxygen in the presence of an oxide of a heavy metal and steam.

JACQUE C. MORRELL.
GUSTAV EGLOFF.